United States Patent [19]

Patel et al.

[11] Patent Number: 4,797,379

[45] Date of Patent: Jan. 10, 1989

[54] ELECTRODE STRUCTURE AND METHOD OF MAKING SAME

[75] Inventors: Pinakin S. Patel, Danbury; Lawrence M. Paetsch, Sherman, both of Conn.

[73] Assignee: Energy Research Corporation, Danbury, Conn.

[21] Appl. No.: 779,294

[22] Filed: Sep. 20, 1985

Related U.S. Application Data

[63] Continuation of Ser. No. 409,518, Aug. 19, 1982, abandoned.

[51] Int. Cl.$^4$ .................. H01M 4/86; H01M 4/88
[52] U.S. Cl. ...................... 502/101; 429/16; 429/41; 429/44; 423/432
[58] Field of Search ........... 429/40, 41, 44, 218.16, 429/45, 46; 423/421, 432; 252/425.3; 204/291

[56] References Cited

U.S. PATENT DOCUMENTS

| | | | |
|---|---|---|---|
| 2,141,458 | 12/1938 | Bates et al. | 423/432 |
| 2,972,529 | 2/1961 | Alexander et al. | 429/45 X |
| 3,042,551 | 7/1962 | Perry | 117/24 |
| 3,120,456 | 2/1964 | Broers | 429/41 |
| 3,268,365 | 8/1966 | McQuade et al. | 429/41 X |
| 3,330,699 | 7/1967 | Tantram | 429/16 |
| 3,359,099 | 12/1967 | Lindstrom | 429/45 X |
| 3,377,265 | 4/1968 | Caesar | 204/291 X |
| 3,414,438 | 12/1968 | Lindholm et al. | 429/45 |
| 3,514,334 | 5/1970 | Novack | 429/16 |
| 3,530,006 | 9/1970 | Makishima et al. | 429/45 X |
| 3,652,208 | 3/1972 | Burk et al. | 423/421 X |
| 3,779,812 | 12/1973 | Witherspoon | 136/120 |
| 3,896,051 | 7/1975 | Mabuchi et al. | 502/25 X |
| 4,115,632 | 9/1978 | Kinoshita et al. | 423/421 X |
| 4,247,604 | 1/1981 | Marianowski et al. | 429/40 |
| 4,329,403 | 5/1982 | Baker | 429/16 X |
| 4,389,467 | 6/1983 | Singh et al. | 429/41 |
| 4,390,446 | 6/1983 | Barnette et al. | 429/218 X |

FOREIGN PATENT DOCUMENTS

| | | |
|---|---|---|
| 2945565 | 5/1980 | Fed. Rep. of Germany . |
| 1352040 | 5/1980 | France . |
| 472403 | 9/1975 | U.S.S.R. ................ 252/425.3 |

*Primary Examiner*—Brian E. Hearn
*Assistant Examiner*—Stephen J. Kalafut
*Attorney, Agent, or Firm*—Robin, Blecker & Daley

[57] ABSTRACT

An electrode provided with an alkali or alkaline earth hydroxide constituent which upon heat treatment in the presence of carbon dioxide is converted to a carbonate constituent.

10 Claims, 1 Drawing Sheet

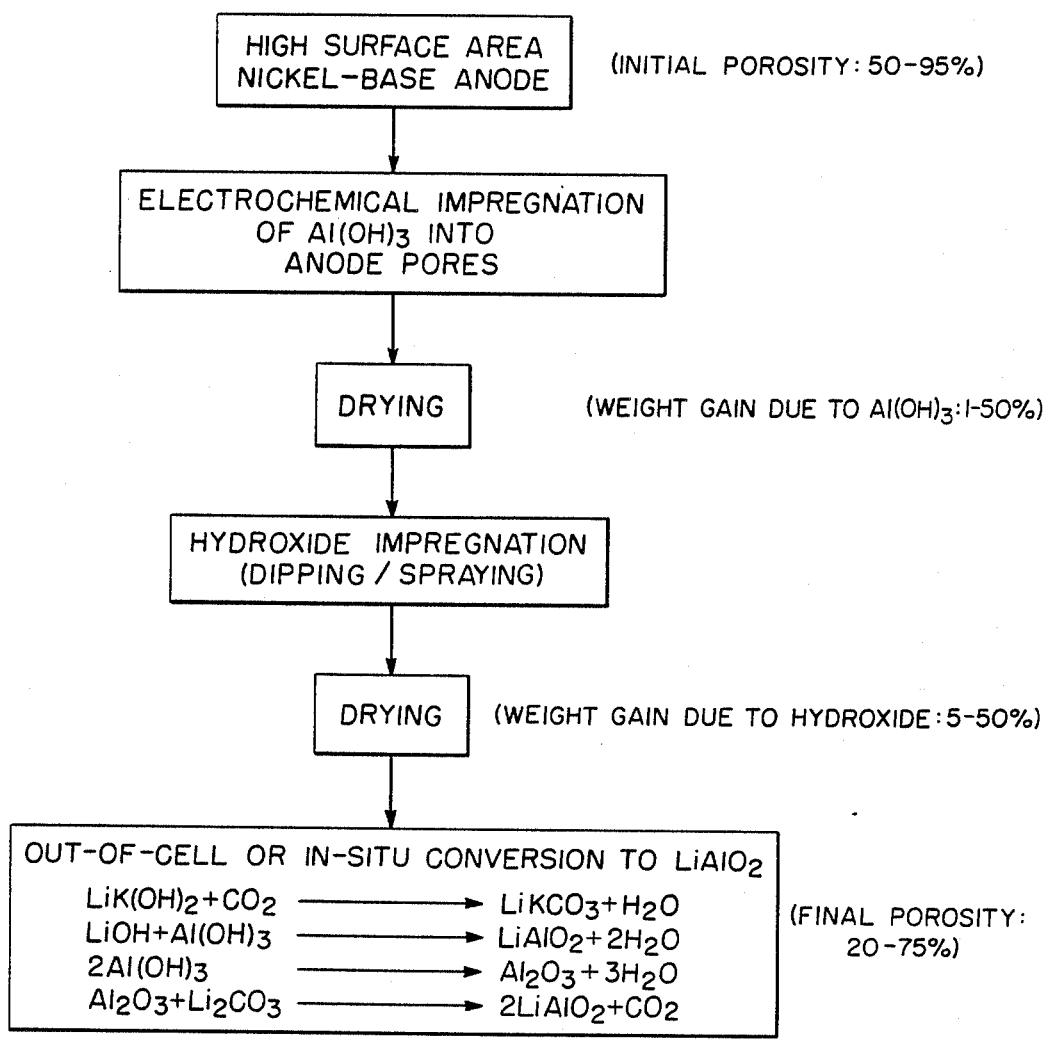

ELECTRODE STRUCTURE AND METHOD OF MAKING SAME

This application is a continuation, of application Ser. No. 409,518, filed Aug. 19, 1982, abandoned.

BACKGROUND OF THE INVENTION

This invention pertains to electrodes and, in particular, to electrodes for use with molten carbonate fuel cells.

In the design of electrodes for molten carbonate fuel cells, it is essential that the electrodes be provided with carbonate constituent to provide the needed bridge with the carbonate electrolyte tile. In present structures, one technique for providing the needed carbonate constituent is to fill the electrolyte tile with excess carbonate and allow some of the excess to drain into the electrodes. The electrolyte becomes depleted in the tile and electrodes during the course of fuel cell operation and limits the useful life of the fuel cell.

A storage of excess carbonate electrolyte can be provided in the electrolyte tile by increasing its thickness. However, increasing the tile thickness decreases the fuel cell output and, thus, is undesirable.

To avoid having to increase the tile thickness, other practices have been used in which carbonate electrolyte is supplied directly to the electrodes. While this requires increased electrode thickness, such increased thickness is not detrimental to cell performance. Present techniques for adding carbonate electrolyte to the electrodes, however, are inefficient and could have an adverse effect on the electrode characteristics.

In particular, carbonate electrolyte is usually added by melting the electrolyte directly into the electrode at high temperatures (e.g., 600° C.). When this is carried out using gases that the fuel electrode would normally be subjected to during fuel cell operation, wetting of the electrode is poor and inhibits electrolyte absorption. Thus, in this case, the high temperatures used can adversely affect the electrode characteristics and the degree of added electrolyte is not substantial. Moreover, while the amount of electrolyte can be increased by using a different gas during the heating, the change in gas composition can also adversely affect the electrode characteristics.

It is therefore an object of the present invention to provide a practice for incorporating carbonate electrolyte into an electrode which does not suffer from the above disadvantages.

It is a further object of the present invention to provide an improved electrode for molten carbonate fuel cells.

SUMMARY OF THE INVENTION

In accordance with the principles of the present invention, the above and other objectives are realized in an electrode provided with an alkali and or alkaline earth hydroxide constituent. Such constituent is added to the electrode at room temperature and the electrode is subsequently heat treated in a carbon dioxide environment either in or out of cell to convert the hydroxide constituent to a carbonate. The resultant electrode thereby includes the desired carbonate electrolyte in an amount which can be readily controlled and selected by the initial selection and introduction of the hydroxide constituent at room temperature.

In a further aspect of the present invention, a ceramic oxide constituent is also included in the electrode. This constituent also reacts with the hydroxide constituent during heating to provide a stable component which affords sintering resistance and greater carbonate retaining capability.

BRIEF DESCRIPTION OF THE DRAWINGS

The above and other features and aspects of the present invention will become more apparent upon reading the following detailed description in conjunction with the accompanying drawings, in which:

FIG. 1 shows an electrode in accordance with the principles of the present invention; and FIG. 2 illustrates a flow diagram for fabricating electrodes in accordance with the invention.

DETAILED DESCRIPTION

In FIG. 1, an electrode in accordance with the principles of the invention is shown. The electrode is to be used in a fuel cell employing a carbonate electrolyte tile. The cation of the tile may be any alkaline constituent, such as, for example, Li, K, Na, etc. The electrode 1 comprises a base metallic structure preferably formed of a nickel or a nickel alloy such as, for example, Ni-Co, Ni-Cr, Ni and other metals, etc.

In accordance with the invention, the electrode 1 is additionally filled or impregnated with an alkali and/or alkaline earth hydroxide having a preselected cation component similar to the caton of the carbonate tile with which the electrode is to be used. This impregnation is carried out at room temperature by a conventional technique, such as, for example, dipping, spraying or vacuum filtration, using a solution of desired hydroxide. Depending upon the particular process used and type of electrode, a suitable organic or inorganic solvent may be used to form the hydroxide solution. Preferable solvents are water, methanol, ethanol and isopropanol.

The amount of hydroxide impregnated should be such as to provide the needed contact and bridge between the electrode and the electrolyte tile during fuel cell operation and, moreover, should be such as to provide an inventory for replenishing electrolyte depleted during operation. Preferably the amount of impregnated hydroxide should be such as to result in electrolyte in the electrode which fills from 5 to 85 percent of the electrode pore volume.

Subsequent to impregnating the electrode with the desired hydroxide constituent, the hydroxide is converted to carbonate electrolyte by exposure to a carbon dioxide atmosphere at a temperature above 100° C. This treatment can be carried out out-of-cell or in-cell and provides the resultant electrode with the desired carbonate constituent make-up.

In a further aspect of the invention, the hydroxide added to the electrode 1, in addition to providing the carbonate electrolyte upon heat treatment, also converts any ceramic oxides or hydroxides in the electrode to stabilizing components. In accordance with this aspect of the invention, ceramic oxides, such as, for example, alumina, zirconia, iron oxide, etc., may be added by any conventional process to the electrode subsequent to sintering, these oxides then being converted by the hydroxides to the desired stabilizing components. In this case, the amount of hydroxide added should be selected to be sufficient to convert the ceramic oxides, as well as to convert the hydroxide to the desired amount of carbonate electrolyte.

In preferred construction, the hydroxide added to the electrode contains lithium hydroxide for reacting with the ceramic oxides. For ceramic oxides such as, for example, $ZrO_2$, $Al_2O_3$ and $Fe_2O_3$ respective components $Li_2ZrO_3$, $LiAlO_2$ and $LiFeO_2$ having extremely high sintering resistance and stability are produced. These components, furthermore, fill the pores of the electrode and enhance the electrolyte storage and wicking properties. Preferably, the added ceramic oxide includes $Al_2O_3$ or $Al(OH)_3$ so that the reaction with lithium hydroxide produces highly stable lithium aluminate.

The invention will be further illustrated by the following examples and tables.

EXAMPLE I

A nickel-cobalt anode for a fuel cell was impregnated with alkali hydroxides of Li-K composition similar to that of the electrolyte tile of the cell (identified as Cell 149 in Table 1 below). The amount of hydroxide was equivalent to filling approximately 10% of the electrode pore volume with carbonates. The conversion of hydroxides to carbonates was performed in-cell in the presence of $CO_2$ during the early cell heat up cycle. As can be seen from Table 1, the performance of the cell was 35 mV higher at 115 mA/cm$^2$ than that of a cell (identified as cell 151) assembled with similar components and no hydroxide treatment.

TABLE 1
RESULTS OF HYDROXIDE (LiKOH) WETTED ANODE STRUCTURES IN FUEL CELLS

| Cell No. | Hydroxide Treatment | Performance at 115 mA/cm$^2$ (mV) | Comment |
|---|---|---|---|
| 149 | Yes | 860 | Improvement of 35 mv |
| 151 | No | 825 | |

EXAMPLE 2

In this example, both hydroxide components and ceramic oxide components were added to nickel-based carbonate fuel cell anodes to provide carbonate electrolyte and stable sintering retardant constituents. The flow diagram of the procedure followed is shown in FIG. 2 which also provides desirable porosity ranges for the initial and final anode structures and desirable weight gain ranges due to the addition of the hydroxide and ceramic oxide components. A total of four cells were assembled with the alkali hydroxide and aluminum hydroxide treatment.

The anodes were first electrochemically impregnated with $Al(OH)_3$. The amount of $Al(OH)_3$ was determined based upon a desired final electrode porosity. After impregnation, the electrodes were sprayed with an alkali hydroxide (Li—K—OH) solution in methanol. The reaction of lithium hydroxide with aluminum hydroxide produced lithium aluminate and the presence of carbon dioxide caused the conversion of the remainder of the alkali hydroxides to alkali carbonates.

Performance of the fuel cells assembled with these hydroxide-treated anodes are compared with cells assembled with untreated anodes in Table 2. All the cells treated with hydroxides displayed significantly better performance (40-75 mV higher at 115 mA/cm$^2$). Also, cell endurance with the stabilized anodes was better than that of cells assembled with conventional nickel anodes. This can be attributed to the sintering resistance imparted by lithium aluminate. An additional advantage is also derived from the fine particle structure of lithium aluminate formed in the electrode pores. This fine particle structure improves the capability of the cell to withstand high differential pressures across the fuel and oxidant chambers.

TABLE 2
RESULTS OF Al(OH)$_3$ IMPREGNATION FOLLOWED BY HYDROXIDE TREATMENT IN FUEL CELLS

| Cell Nos. | Al(OH)$_3$ LikOH Treatment | Cell Design | Performance at 115 mA/cm$^2$ mV | Comments |
|---|---|---|---|---|
| S7-7, 7-14, 7-18, 7-31 | No | Standard | 770-820 | Significant performance losses observed during first 300 hours of cell operation |
| 7-38 7-40 | Yes | Standard | 850-870 | 40-50 mV improvement and stable for 4000 hours |
| 7-35 | Yes | Nickel - cobalt anode | 880 | 60 mV improvement and stable for 750 hours (voluntary termination) |
| IR7-1 | Yes | Nickel current collectors for anode | 895 | 75 mV improvement |

In all cases it is understood that the above-described arrangements are merely illustrative of the many possible specific embodiments which represent applications of the present invention. Numerous and varied other arrangements can readily be devised without departing from the spirit and scope of the invention.

What we claim is:

1. A method of fabricating a molten carbonate fuel cell electrode from an electrode structure having pores, the method comprising:
   preselecting an amount of carbonate constituent for said electrode;
   selecting a stabilizing constituent for said electrode;
   incorporating a ceramic oxide into said pores of said electrode structure;
   incorporating an alkaline hydroxide in solution form into said pores of said electrode sturcture at about room temperature, said step of incorporating said alkaline hydroxide constituent including selecting the amount of alkaline hydroxide to be sufficient to enable said alkaline hydroxide and said ceramic oxide in the pores of said electrode structure to be converted to said preselected amount of carbonate constituent and said stabilizing constituent upon subjecting said electrode structure to carbon dioxide;

and subsequent to said incorporation steps, subjecting the electrode structure carrying said alkaline hydroxide and said ceramic oxide in the pores of the electrode structure to carbon dioxide to convert the alkaline hydroxide and said ceramic oxide to said preselected amount of carbonate constituent and said stabilizing constituent.

2. A method in accordance with claim 1 wherein: said incorporation of said alkaline hydroxide and said ceramic oxide is by impregnation.

3. A method in accordance with claim 1 wherein: said hydroxide is one of an alkali hydroxide and an alkaline earth hydroxide.

4. A method in accordance with claim 3 wherein: said hydroxide is one of lithium, potassium and sodium hydroxide.

5. A method in accordance with claim 1 wherein: said ceramic oxide incorporation is prior to said hydroxide incorporation.

6. A method in accordance with claim 1 wherein: said ceramic oxide is one of alumina, zirconia and iron oxide.

7. A method in accordance with claim 1 wherein: said hydroxide is lithium hydroxide.

8. A method in accordance with claim 1 wherein: said alkaline hydroxide constituent comprises an alkali hyrdoxide and an alkaline earth hydroxide.

9. A method in accordance with claim 1 further comprising: heating said electrode in the presence of said carbon dioxide subsequent to said electrode being incorporated into a fuel cell.

10. A method in accordance with claim 1 further comprising: heating said electrode in the presence of said carbon dioxide prior to said electrode being incorporated into a fuel cell.

* * * * *